(12) United States Patent
Sommer et al.

(10) Patent No.: US 9,631,117 B2
(45) Date of Patent: Apr. 25, 2017

(54) PROCESS FOR THE PREPARATION OF LOW-VISCOSITY, WATER-DILUTABLE URETHANE (METH)ACRYLATES

(71) Applicant: ALLNEX IP S.a.r.L., Luxemberg (LU)

(72) Inventors: Stefan Sommer, Leverkusen (DE); Michael Ludewig, Odenthal (DE); Wolfgang Fischer, Meerbusch (DE); Nusret Yuva, Burscheid (DE)

(73) Assignee: ALLNEX IP S.a.r.L.

(*) Notice: Subject to any disclaimer, the term of this patent is extended or adjusted under 35 U.S.C. 154(b) by 8 days.

(21) Appl. No.: 13/651,581

(22) Filed: Oct. 15, 2012

(65) Prior Publication Data

US 2013/0095330 A1    Apr. 18, 2013

(30) Foreign Application Priority Data

Oct. 14, 2011 (EP) .................... 11185177

(51) Int. Cl.
| | | |
|---|---|---|
| C08G 18/67 | (2006.01) | |
| C09J 175/16 | (2006.01) | |
| B32B 27/06 | (2006.01) | |
| C09D 175/16 | (2006.01) | |
| C08G 18/48 | (2006.01) | |
| C08G 18/08 | (2006.01) | |
| C08G 18/10 | (2006.01) | |
| C08G 18/34 | (2006.01) | |

(52) U.S. Cl.
CPC ....... *C09D 175/16* (2013.01); *C08G 18/0823* (2013.01); *C08G 18/0828* (2013.01); *C08G 18/10* (2013.01); *C08G 18/348* (2013.01); *C08G 18/4833* (2013.01); *C08G 18/672* (2013.01); *C08G 18/673* (2013.01); *Y10T 428/31591* (2015.04)

(58) Field of Classification Search
CPC  C08G 18/0823; C08G 18/0828; C08G 18/10; C08G 18/348; C08G 18/3821; C08G 18/3855; C08G 18/48; C08G 18/4833; C08G 18/672; C08G 18/673; C09D 175/16; Y10T 428/31551; Y10T 428/31591

USPC ............ 428/423.1, 425.1; 528/205; 524/590
See application file for complete search history.

(56) References Cited

U.S. PATENT DOCUMENTS

| | | | |
|---|---|---|---|
| 4,108,814 A | 8/1978 | Reiff et al. | |
| 5,596,065 A | 1/1997 | Gerlitz et al. | |
| 6,100,326 A | 8/2000 | Richter et al. | |
| 6,150,458 A | 11/2000 | Weikard et al. | |
| 6,153,788 A | 11/2000 | Fischer et al. | |
| 2003/0050390 A1 | 3/2003 | Weikard et al. | |
| 2003/0162892 A1* | 8/2003 | Maier et al. .................. | 524/839 |
| 2004/0260015 A1* | 12/2004 | Munzmay et al. ........... | 524/589 |
| 2008/0171832 A1* | 7/2008 | Gertzmann et al. .......... | 524/839 |
| 2009/0269568 A1* | 10/2009 | Kuhlmann ......... | C08G 18/0823 428/220 |
| 2009/0270581 A1* | 10/2009 | Tielemans et al. ............ | 528/59 |
| 2010/0204434 A1* | 8/2010 | Ludewig et al. ............. | 528/310 |
| 2010/0210757 A1* | 8/2010 | Sommer ............ | C08G 18/0823 523/402 |
| 2011/0086180 A1* | 4/2011 | Tielemans .................... | 427/487 |

FOREIGN PATENT DOCUMENTS

| | | |
|---|---|---|
| CA | 2253119 A1 | 5/1999 |
| DE | 2446440 C3 | 4/1981 |
| DE | 102010001956 A1 | 8/2010 |
| EP | 0900778 B1 | 11/2001 |
| EP | 0976716 B1 | 2/2003 |
| EP | 916647 B1 | 1/2005 |
| EP | 928799 B1 | 3/2005 |
| WO | WO-03022902 A1 | 3/2003 |
| WO | WO-2009/095432 A1 | 8/2009 |
| WO | WO 2009095432 A1 * | 8/2009 |

* cited by examiner

*Primary Examiner* — Thao T Tran
(74) *Attorney, Agent, or Firm* — Drinker Biddle & Reath LLP

(57) ABSTRACT

The present invention relates to a process for the preparation of highly reactive, low-viscosity and water-dilutable polyisocyanate reaction products which contain activated groups which react, by polymerization, with ethylenically unsaturated compounds under the action of actinic radiation. The present invention furthermore relates to a process for the preparation of such products and their use.

19 Claims, No Drawings

PROCESS FOR THE PREPARATION OF LOW-VISCOSITY, WATER-DILUTABLE URETHANE (METH)ACRYLATES

CROSS-REFERENCE TO RELATED APPLICATIONS

This application claims benefit under 35 U.S.C. §§119 (a)-(d) of European Patent Application No. 11185177.0, filed Oct. 14, 2011.

BACKGROUND OF THE INVENTION

The present invention relates to a process for the preparation of highly reactive, low-viscosity and water-dilutable polyisocyanate reaction products which contain activated groups which react, by polymerization, with ethylenically unsaturated compounds under the action of actinic radiation. The present invention furthermore relates to a process for the preparation of such products and their use.

The curing of coating systems carrying activated double bonds by actinic radiation is known and is established in industry. Actinic radiation is understood as meaning electromagnetic, ionizing radiation, in particular electron beams, UV rays and visible light (Roche Lexikon Medizin, 4th edition; Urban & Fischer Verlag, Munich 1999). It is one of the fastest methods of curing in coating technology. Coating compositions based on this principle are therefore called radiation- or actinic-curing or -curable systems.

Due to the ecological and economic requirements of modern lacquer systems of using as little organic solvent as possible or even no organic solvent to adjust the viscosity, there is the desire on the one hand to use lacquer raw materials which are already low-viscosity and on the other hand moreover to be able to carry out necessary viscosity adjustments with water as the solvent.

Widely used systems of which the viscosity is adjusted by water are polyurethane dispersions which have also established themselves as radiation-curable raw materials. Nevertheless, dispersions are relatively difficult to prepare due to the necessary dispersing step, and as a rule have only a low solids content of from 30 to 50 wt. %. The high water content of these dispersions must be removed again after application and before curing. On the one hand the possible application thickness of the material is therefore reduced, and on the other hand a longer time for drying in air is required.

Water-dilutable, radiation-curable polyurethane systems with which it is possible to achieve very high solids contents of more than 80 wt. % have also been disclosed. These are as a rule polyurethanes which are based on polyethylene oxide polyols and can be diluted with a little water to give a clear solution.

Such a radiation-curable, water-dilutable polyurethane system is described, for example, in WO-A 2009/095432. The binders described can indeed be diluted with water, but after radiation curing they are very soft and not resistant to chemicals. In some cases the binders are solid at a solids content of 100 wt. % because of a high polyether content, and they must first be melted, which makes their handling expensive.

Water-dilutable, radiation-curable polyurethane systems are also described in DE-A 102010001956. The binders disclosed likewise can be diluted with water, but after radiation curing they are very soft and not resistant to chemicals.

It was therefore the object of the present invention to provide a process for the preparation of a radiation-curable polyurethane (meth)acrylate which is of particularly low viscosity as an undiluted system with a solids content of 100 wt. %, i.e. has shear viscosities at 23° C. in accordance with DIN EN ISO 3219 of ≤20 Pas, preferably ≤15 Pas and particularly preferably ≤10 Pas, and can be diluted with water over a wide range. Furthermore, the water-diluted radiation-curable polyurethane (meth)acrylate should be storage-stable. The radiation-cured films should have a high pendulum hardness and an adequate resistance to chemicals.

EMBODIMENTS OF THE INVENTION

An embodiment of the present invention is a process for preparing a low-viscosity, water-dilutable polyurethane (meth)acrylate, comprising reacting components (a), (b), and (d)
  (a) at least one organic polyisocyanate with two isocyanate functions;
  (b) at least one polyoxyalkylene polyol based on a starter molecule which comprises at least three hydroxy functions and is partially reacted by esterification with (meth)acrylic acid such that on average 0.2 to 1.5 hydroxy functions still remain;
  (d) at least one compound which has at least one group which is reactive towards isocyanate and at least one ionic or potentially ionic function;
to form said low-viscosity, water-dilutable polyurethane (meth)acrylate;
wherein
the reaction product of components (a), (b), and (d) has an NCO content of less than 0.5 weight %, and
said polyurethane (meth)acrylate is not prepared from components selected from the group consisting of
  (i) organic polyisocyanates with three or more isocyanate functions, and
  (ii) polyoxyalkylene polyols which have a maximum of two hydroxy functions but no further groups which can be crosslinked by actinic radiation.

Another embodiment of the present invention is the above process, wherein component (c) comprises at least one hydroxyalkyl (meth)acrylate.

Another embodiment of the present invention is the above process, wherein a further component (e), which is an organic compound which has one or two isocyanate-reactive functions and a molecular weight of less than 240 g/mol, is reacted with components (a), (b), and (d).

Another embodiment of the present invention is the above process, wherein said polyurethane (meth)acrylate contains less than 40 weight % of alkylene oxide units.

Another embodiment of the present invention is the above process, wherein component (d) is at least one compound with at least one group which is reactive towards isocyanate and at least one potentially anionic group.

Another embodiment of the present invention is the above process, wherein component (d) is selected from the group consisting of the addition products of acrylic acid on diamines in the ratio of 1:1.

Another embodiment of the present invention is the above process, wherein component (a) is employed in amounts of from 8 to 40 weight %, component (b) is employed in amounts of from 40 to 90 weight %, component (c) is employed in amounts of from 0 to 20 weight %, component (d) is employed in amounts of from 1 to 6 weight % and component (e) is employed in amounts of from 0 to 20 weight %, wherein the sum of the weight % of components (a) to (e) add up to 100.

Yet another embodiment of the present invention is a water-dilutable polyurethane (meth)acrylate obtained by the above process.

Yet another embodiment of the present invention is a coating comprising the above water-dilutable polyurethane (meth)acrylate of claim 8.

Another embodiment of the present invention is the above coating, wherein said coating is a lacquer or adhesive.

Yet another embodiment of the present invention is a coating composition comprising the above water-dilutable polyurethane (meth)acrylate.

Yet another embodiment of the present invention is a coating composition comprising
- A) at least one of the above urethane (meth)acrylates;
- B) compounds which differ from A) and contain groups which react, by polymerization, with ethylenically unsaturated compounds under the action of actinic radiation;
- C) aqueous binders which are not radiation-curable;
- D) initiators;
- E) optionally water and/or solvents; and
- F) optionally auxiliary substances and additives.

Yet another embodiment of the present invention is a coating composition comprising
- A) at least one of the above urethane (meth)acrylates;
- B) compounds, dissolved or dispersed in water, which contain unsaturated radiation-curable groups;
- C) compounds, dissolved or dispersed in water, which contain no unsaturated radiation-curable groups;
- D) initiators;
- E) optionally water and/or solvents; and
- F) optionally auxiliary substances and additives.

Another embodiment of the present invention is a substrate coated with the above composition.

Another embodiment of the present invention is the above substrate, wherein said substrate is wood, ligneous substrates, cork, and substrates containing cellulose fibres.

DETAILED DESCRIPTION OF THE INVENTION

The term "water-dilutable" in the context of the invention means that after addition of water, the viscosity of the polyurethane (meth)acrylates according to the invention at a solids content of from 70 to 95 wt. % is at least the same as, preferably lower than that above a solids content of 95 wt. %. In this context, a homogeneous or disperse phase forms above a solids content of 70 wt. %. The solids content is determined in accordance with DIN EN ISO 3251.

Surprisingly, a process for the preparation of water-dilutable, low-viscosity polyurethane (meth)acrylates has been found, characterized in that the polyurethane (meth)acrylates are obtainable by reaction of the components
- (a) at least one or more organic polyisocyanates with two isocyanate functions and
- (b) at least one polyoxyalkylene polyol based on a starter molecule which has at least three hydroxy functions and is partially reacted by esterification with (meth)acrylic acid such that on average 0.2 to 1.5, preferably 0.3 to 1.3, particularly preferably 0.5 to 1.2 hydroxy functions still remain,
- (c) optionally at least one hydroxyalkyl (meth)acrylate,
- (d) at least one compound which has at least one group which is reactive towards isocyanate and at least one ionic and/or potentially ionic function
- (e) optionally an organic compound which has one or two isocyanate-reactive functions and a molecular weight of less than 240 g/mol, characterized in that the reaction product of the components employed has an NCO content of less than 0.5 wt. %, and no components chosen from the group consisting of
- (i) organic polyisocyanates with three or more isocyanate functions,
- (ii) polyoxyalkylene polyols which have a maximum of two hydroxy functions but no further groups which can be crosslinked by actinic radiation are employed as a starting compound.

The invention also provides water-dilutable urethane (meth)acrylates obtainable by the process according to the invention.

The invention also provides the use of the urethane (meth)acrylates according to the invention obtainable by the process according to the invention for the preparation of coatings and lacquers as well as adhesives, printing inks, casting resins, dental compositions, sizes, photoresists, stereolithography systems, resins for composite materials and sealing compositions.

In the context of this invention, "(meth)acrylate" relates to corresponding acrylate or methacrylate functions or to a mixture of the two.

Component (a) comprises polyisocyanates chosen from the group of aromatic, araliphatic, aliphatic or cycloaliphatic polyisocyanates with two isocyanate functions or mixtures of such polyisocyanates. Suitable polyisocyanates are, for example, 1,3-cyclohexane-diisocyanate, 1-methyl-2,4-diisocyanatocyclohexane, 1-methyl-2,6-diisocyanatocyclohexane, tetramethylene-diisocyanate, 4,4'-diisocyanatodiphenylmethane, 2,4'-diisocyanatodiphenylmethane, 2,4-diisocyanatotoluene, 2,6-diisocyanatotoluene, α,α,α',α'-tetramethyl-m- or -p-xylylene-diisocyanate, 1,6-hexamethylene-diisocyanate, 1-isocyanato-3,3,5-trimethyl-5-isocyanatomethylcyclohexane (1-isocyanato-3,3,5-trimethyl-5-isocyanatomethylcyclohexane or IPDI), 4,4'-diisocyanatodicyclohexylmethane, 1,3-bis(isocyanatomethyl)benzene (XDI), 1,3-bis(1-isocyanato-1-methylethyl)benzene (TMXDI) and mixtures thereof.

The use of at least one polyoxyalkylene polyol based on a starter molecule which has at least three hydroxy functions and is partially reacted by esterification with (meth)acrylic acid such that on average 0.2 to 1.5, preferably 0.3 to 1.3, particularly preferably 0.5 to 1.2 hydroxy functions still remain (b) is essential to the invention. This component on the one hand leads to a higher water-compatibility and on the other hand contributes to the high reactivity of the products according to the invention. Component (b) in this context comprises short-chain polyalkylene oxide polyols which have been built up by on average 0.5 to 8.0, preferably 0.5 to 6.0, particularly preferably 0.5 to 4.0 alkylene oxide units, preferably ethylene oxide units, per hydroxyl group of the starter molecule.

Possible starter molecules are low molecular weight polyols up to a molecular weight of 400 g/mol, such as, for example, trimethylolethane, trimethylolpropane, glycerol, pentaerythritol, di-trimethylolpropane or dipentaerythritol.

The alkoxylated, preferable ethoxylated polyols are partially esterified with (meth)acrylic acid, preferably acrylic acid. In this context, the degree of esterification is chosen such that on average 0.2 to 1.5, preferably 0.3 to 1.3, particularly preferably 0.5 to 1.2 hydroxyl groups per molecule still remain free and the rest of the hydroxyl groups are esterified with (meth)acrylic acid. The preparation of such partially acrylated alkoxylated, preferably ethoxylated polyols is described e.g. in EP-A 0900778, EP-A 0976716 or WO-A 2003/022902.

Compounds which fall under component (b) preferably have OH numbers (OHN) of from 20 to 150 mg of KOH/g, particularly preferably from 40 to 100 mg of KOH/g and very particularly preferably from 40 to 80 mg of KOH/g of substance.

The OH number is determined titrimetrically in accordance with DIN 53240-2.

The polyurethane (meth)acrylates according to the invention preferably contain less than 40 wt. % of alkylene oxide units.

Hydroxyalkyl (meth)acrylates (c) in the context of the invention are understood as meaning compounds which contain one or more (meth)acrylate groups, in addition to (on average) one hydroxy function. The various functions in this context are bonded by short-chain (C2-C12) linear or branched alkyl chains. Examples of such compounds are hydroxyethyl (meth)acrylate, hydroxypropyl (meth)acrylate, hydroxybutyl (meth)acrylate, 3-hydroxy-2,2-dimethylpropyl (meth)acrylate, glycerol di(meth)acrylate, trimethylolpropane di(meth)acrylate, pentaerythritol tri(meth) acrylate or dipentaerythritol penta(meth)acrylate.

Component (c) is optional, and the use of hydroxyethyl (meth)acrylate, hydroxypropyl (meth)acrylate, hydroxybutyl (meth)acrylate and pentaerythritol tri(meth)acrylate is preferred. Hydroxyethyl acrylate and hydroxypropyl acrylate are very particularly preferred.

Component (d) comprises compounds with at least one group which is reactive towards isocyanate and additionally at least one ionic and/or potentially ionic group. It has a hydrophilizing action on the polyurethane (meth)acrylates according to the invention.

The groups having a hydrophilizing action include ionic groups (d1) and/or the ionic groups (d1) which originate from potentially ionic groups (d2) (for example by salt formation), which can be of anionic nature (d1.1), such as, for example, sulfonium, phosphonium, carboxylate, sulfonate, phosphonate groups, or of cationic nature (d1.2), such as, for example, ammonium groups, and/or potentially ionic groups (d2), i.e. groups which can be converted into ionic groups (d1), for example by salt formation. They are incorporated into the macromolecules by isocyanate-reactive groups. Isocyanate-reactive groups which are preferably suitable are hydroxyl and amino groups.

Compounds containing potentially ionic groups (d2) include compounds with potentially anionic groups (d2.1), such as, for example, mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and/or compounds with potentially cationic groups (d2.2), such as, for example, ethanolamine, diethanolamine, triethanolamine, 2-propanolamine, dipropanolamine, tripropanolamine, N-methylethanolamine, N-methyldiethanolamine and N,N-dimethylethanolamine.

Preferred compounds containing potentially anionic groups (d2.1) are chosen from the group consisting of dimethylolpropionic acid, dimethylolbutyric acid, hydroxypivalic acid, N-(2-aminoethyl)alanine, 2-(2-aminoethylamino)ethanesulfonic acid, ethylenediamine-propyl- or -butylsulfonic acid, 1,2- or 1,3-propylenediamine-ethylsulfonic acid, 3-(cyclohexylamino)propane-1-sulfonic acid, malic acid, citric acid, glycollic acid, lactic acid, glycine, alanine, taurine, lysine, 3,5-diaminobenzoic acid, the addition products of acrylic acid on diamines in the ratio of 1:1, such as e.g. on isophoronediamine (EP-A 916 647, Example 1) or on ethylenediamine (PUD salt or N-(2-aminoethyl)-β-alanine), the adduct of sodium bisulfite on but-2-ene-1,4-diol polyether sulfonate and the propoxylated adduct of 2-butenediol and $NaHSO_3$, as described in DE-A 2 446 440 on page 5-9, formula I-III.

Particularly preferred compounds containing potentially ionic groups (d2) are compounds which contain carboxyl groups or tertiary amino groups and have two reactive groups which are reactive towards isocyanate, such as, for example, the addition products of acrylic acid on diamines in the ratio of 1:1, such as e.g. on isophoronediamine (EP-A 916 647, Example 1) or on ethylenediamine (PUD salt or N-(2-aminoethyl)-β-alanine), dimethylolpropionic acid, N— and/or methyldiethanolamine Component (d) very particularly preferably contains as compounds with potentially anionic groups the addition products of acrylic acid on diamines in the ratio of 1:1, such as e.g. the addition product of acrylic acid on isophoronediamine (EP-A 916 647, Example 1) or on ethylenediamine (PUD salt or N-(2-aminoethyl)-β-alanine).

The acids mentioned under component (d) are converted into the corresponding salts by reaction with neutralizing agents, such as e.g. triethylamine, ethyldiisopropylamine, dimethylcyclohexylamine, dimethylethanolamine, ammonia, N-ethylmorpholine, LiOH, NaOH and/or KOH. In this context, the degree of neutralization is preferably between 50 and 125%. The degree of neutralization is defined as follows: In the case of acid-functionalized polymers, as the quotient of base and acid; in the case of base-functionalized polymers, as the quotient of acid and base. If the degree of neutralization is above 100%, in the case of acid-functionalized polymers more base is added than there are acid groups in the polymer; in the case of base-functionalized polymers more acid is added than there are base groups in the polymer.

The bases mentioned under component (d) are converted into the corresponding salts by reaction with neutralizing agents, such as e.g. inorganic acids, such as, for example, hydrochloric acid, phosphoric acid and/or sulfuric acid, and/or organic acids, such as, for example, formic acid, acetic acid, lactic acid, methane-, ethane- and/or p-toluenesulfonic acid. In this context, the degree of neutralization is preferably between 50 and 125%.

The compounds listed under component (d) can also be used in mixtures.

If the polyurethane (meth)acrylates according to the invention are based on the anionic and/or potentially anionic compounds mentioned under (d), they have a calculated acid number of $\geq 3$ and $\leq 12$, preferably $\geq 6$ and $\leq 10$ mg of KOH/g of substance.

If the polyurethane (meth)acrylates according to the invention are based on the cationic and/or potentially cationic compounds mentioned under (d), they have a calculated amine number of $\geq 3$ and $\leq 16$, preferably $\geq 3$ and $\leq 12$, very particularly preferably $\geq 6$ and $\leq 10$ mg of KOH/g of substance.

Component (e) contains organic compounds which have one or two isocyanate-reactive functions and a molecular weight of less than 240 g/mol.

These can be, for example, alcohols, such as methanol, ethanol, 1-propanol, 1-butanol, 1-pentanol, 1-hexanol, 2-propanol, 2-butanol, 2-ethylhexanol, benzyl alcohol, ethylene glycol, diethylene glycol, triethylene glycol, tetraethylene glycol, dipropylene glycol, tripropylene glycol, 1,2- propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane and/or castor oil. Neopentyl glycol, 1,4-butanediol, 1,4-cyclohexanedimethanol, 1,6-hexanediol and/or trimethylolpropane, or amines, such as benzylamine, butylamine, dibutylamine, ethylenediamine, 1,6-hexamethylenediamine, isophoronediamine, 1,3-, 1,4-phenylenediamine, piperazine, 4,4'-diphenylmethanediamine and hydrazine, are preferred.

Organic polyisocyanates with three or more isocyanate functions (i) are aromatic, aliphatic and/or cycloaliphatic polyisocyanates with three or more isocyanate functions. Such polyisocyanates are, for example, 4-isocyanatomethyl-1,8-octane-diisocyanate (triisocyanatononane, TIN) (EP-A 928 799) and homologues or oligomers of the polyisocyanates listed under (a) with biuret, carbodiimide, isocyanurate, allophanate, iminooxadiazinedione and/or uretdione groups, and mixtures comprising these compounds.

Polyoxyallylene polyols which have a maximum of two hydroxy functions but no further groups which can be crosslinked by actinic radiation (ii) are prepared via alkoxylation reactions with ethylene oxide and/or propylene oxide starting from mono- or difunctional alcohols as starter molecules (e.g. in Ullmanns Encyclopädie der technischen Chemie, 4th edition, volume 19, Verlag Chemie, Weinheim p. 31-38). These compounds are often employed as compounds which have a nonionic hydrophilizing action and which are used for aqueous binders, but they have the disadvantage that the corresponding coatings of these binders are often soft after curing and remain sensitive to mechanical and chemical influences.

Component (a) is employed in amounts of from 8 to 40 wt. %, preferably from 8 to 30 wt. % and particularly preferably from 8 to 20 wt. %, component (b) in amounts of from 40 to 90 wt. %, preferably from 60 to 90 wt. % and particularly preferably from 80 to 90 wt. %, component (c) in amounts of from 0 to 20 wt. %, preferably from 0 to 10 wt. %, component (d) in amounts of from 1 to 6 wt. %, preferably from 1 to 4 wt. %, particularly preferably from 2 to 3 wt. % and component (e) in amounts of from 0 to 20 wt. %, preferably from 0 to 10 wt. %, the sum of the wt. % of components (a) to (e) adding up to 100.

The reaction of the isocyanate-containing components (a) with the isocyanate-reactive components (b) and (e), optionally (c) and (e) is carried out in a urethanation reaction known per se to the person skilled in the art.

In this context, the isocyanate-containing compounds (a) are reacted with the isocyanate-reactive components (b) and (c), optionally (c) and (e) in a ratio of equivalents of 1:1 to 1:1.5, preferably 1:1 to 1:1.2 and particularly preferably 1:1 to 1:1.05.

The neutralization of component (d) can be carried out, if necessary, before, during or after the reaction with component (a).

The reaction is carried out at temperatures of from 25 to 100° C., preferably 40 to 80° C., over a period of time of from 2 to 30 hours, preferably 4 to 15 hours.

In this context, the reaction is carried out until a residual NCO content of less than 0.5, preferably less than 0.3 wt. % is reached.

To accelerate the reaction, it is preferable to employ catalysts. For this, urethanation catalysts known per se to the person skilled in the art, such as e.g. tertiary amines or Lewis acids, are possible. There may be mentioned by way of example organotin compounds, such as e.g. dibutyltin diacetate, dibutyltin dilaurate, dibutyltin bisacetoacetonate, or zinc compounds, such as e.g. zinc acetylacetonate or zinc octoate. The use of Lewis acid metal compounds which contain molybdenum, vanadium, zirconium, caesium, bismuth or tungsten is likewise conceivable.

In the process according to the invention, the catalyst component, if co-used, is employed in amounts of 0.001-5.0 wt. %, preferably 0.001-0.1 wt. %, based on the solids content of the process product.

Solvents or reactive diluents can optionally be employed at any desired point in the process according to the invention. The use of solvents and/or reactive diluents is not preferred.

Suitable solvents are inert towards the functional groups present in the process product from the point in time of addition to the end of the process. Solvents used in lacquer technology e.g. are suitable, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide, dimethylformamide, preferably, however, no solvent being added.

Compounds which likewise (co)polymerize during the UV curing and are thus incorporated into the polymer network and which are inert towards NCO groups can be co-used as reactive diluents. Such reactive diluents are described by way of example in P. K. T. Oldring (ed.), Chemistry & Technology of UV & EB Formulations For Coatings, Inks & Paints, vol. 2, 1991, SITA Technology, London, p. 237-285. These can be esters of acrylic acid or methacrylic acid, preferably of acrylic acid, with mono- or polyfunctional alcohols. Suitable alcohols are, for example, the isomeric butanols, pentanols, hexanols, heptanols, octanols, nonanols and decanols, and furthermore cycloaliphatic alcohols, such as isobornol, cyclohexanol and alkylated cyclohexanols, dicyclopentanol, arylaliphatic alcohols, such as phenoxyethanol and nonylphenylethanol, and tetrahydrofurfuryl alcohols. Alkoxylated derivatives of these alcohols can furthermore be used. Suitable difunctional alcohols are, for example, alcohols such as ethylene glycol, 1,2-propanediol, 1,3-propanediol, diethylene glycol, dipropylene glycol, the isomeric butanediols, neopentyl glycol, 1,6-hexanediol, 2-ethylhexanediol and tripropylene glycol or also alkoxylated derivatives of these alcohols. Preferred difunctional alcohols are 1,6-hexanediol, dipropylene glycol and tripropylene glycol. Suitable trifunctional alcohols are glycerol or trimethylolpropane or alkoxylated derivatives thereof. Tetrafunctional alcohols are pentaerythritol or alkoxylated derivatives thereof. A suitable hexafunctional alcohol is dipentaerythritol or alkoxylated derivatives thereof. The alkoxylated derivatives of the tri- to hexafunctional alcohols mentioned are particularly preferred.

The binders according to the invention are preferably stabilized against premature polymerization. Stabilizers which inhibit the polymerization are therefore added as a constituent of one or more components ((a) to (e)) before and/or during the reaction. Examples of suitable stabilizers are e.g. phenothiazine and phenols, such as para-methoxyphenol, 2,5-di-tert-butylhydroquinone or 2,6-di-tert-butyl-4-methylphenol. N-Oxy compounds are also suitable for the stabilization, such as e.g. 2,2,6,6-tetramethylpiperidine N-oxide (TEMPO) or its derivatives. The stabilizers can likewise also be co-incorporated chemically into the binder, and in this context compounds of the abovementioned classes are suitable in particular if they also carry further free aliphatic alcohol groups or primary or secondary amine groups and therefore can be bonded chemically to compounds of component a) via urethane or urea groups. 2,2, 6,6-Tetramethyl-4-hydroxypiperidine N-oxide is particularly suitable for this.

Other stabilizers, such as e.g. compounds of the HALS (HALS=hindered amine light stabilizers) class can likewise be used, but are not preferred.

An oxygen-containing gas, preferably air, can be passed into and/or over the reaction mixture to stabilize the reaction mixture, in particular the unsaturated groups against premature polymerization. It is preferable for the gas to have the lowest possible content of moisture, in order to prevent undesirable reaction in the presence of isocyanate.

A stabilizer can be added during the preparation of the binders according to the invention, and in order to achieve a long-term stability after-stabilizing can be finally carried out again with a phenolic stabilizer, and the reaction product can optionally be saturated with air.

In the process according to the invention, it is preferable to employ the stabilizer component in amounts of 0.001-5.0 wt. %, preferably 0.01-2.0 wt. % and particularly preferably 0.05-1.0 wt. %, based on the solids content of the process product.

The process according to the invention is preferably carried out in a stirred reactor.

The course of the reaction can be monitored by suitable measuring equipment installed in the reaction vessel and/or with the aid of analyses on samples taken. Suitable methods are known to the person skilled in the art. IR spectroscopy is preferred for monitoring of the free NCO groups still present (for aliphatic NCO groups the band in the IR spectrum is at approx. $v=2272$ $cm^{-1}$).

The unsaturated urethane (meth)acrylates obtainable by the process according to the invention preferably have shear viscosities at 23° C. in accordance with DIN EN ISO 3219 of ≤20 Pas, particularly preferably ≤15 Pas and particularly preferably ≤10 Pas at a solids content of 100 wt. %.

At a solids content of 90 wt. % and a water content of 10 wt. %, the urethane (meth)acrylates according to the invention have a shear viscosity at 23° C. in accordance with DIN EN ISO 3219 of preferably ≤5 Pas and particularly preferably of ≤4 Pas.

At a solids content of 80 wt. % and a water content of 20 wt. %, the urethane (meth)acrylates according to the invention have a shear viscosity at 23° C. in accordance with DIN EN ISO 3219 of preferably ≤4 Pas and particularly preferably of ≤3 Pas.

At a solids content of 70 wt. % and a water content of 30 wt. %, the urethane (meth)acrylates according to the invention have a shear viscosity at 23° C. in accordance with DIN EN ISO 3219 of preferably ≤3 Pas and particularly preferably of ≤2 Pas.

The urethane (meth)acrylates according to the invention can be used for the preparation of coatings and lacquers as well as adhesives, printing inks, casting resins, dental compositions, sizes, photoresists, stereolithography systems, resins for composite materials and sealing compositions. In the case of gluing or sealing, nevertheless, it is a prerequisite that during curing by UV rays at least one of the two substrates to be glued or to be sealed with one another must be permeable, that is to say as a rule transparent, to UV radiation. During radiation with electrons, an adequate permeability to electrons must be ensured. The use in lacquers and coatings is preferred.

The invention also provides coating compositions comprising
 A) one or more of the urethane (meth)acrylates according to the invention,
 B) optionally further compounds which differ from A) and contain groups which react, by polymerization, with ethylenically unsaturated compounds under the action of actinic radiation,
 C) optionally further aqueous binders which are not radiation-curable,
 D) initiators,
 E) optionally water and/or solvents,
 F) optionally auxiliary substances and additives.

The compounds of component B) include non-aqueous compounds, such as, in particular, urethane acrylates, preferably based on hexamethylene-diisocyanate, 1-isocyanato-3,3,5-trimethyl-5-isocyanatomethylcyclohexane, 4,4'-diisocyanatodicyclohexylmethane and/or trimethylhexamethylene-diisocyanate, which can optionally be modified with isocyanurate, allophanate, biuret, uretdione and/or iminooxadiazinetrione groups, and which have no functions which are reactive towards isocyanate groups and contain active hydrogen.

The reactive diluents already described which are known in the art of radiation-curing coatings can furthermore be used as a constituent of B) if they contain no groups which are reactive with NCO groups.

The compounds of component B) also include compounds dissolved or dispersed in water, such as, in particular, dispersions, which contain unsaturated, radiation-curable groups, such as e.g. dispersions which contain unsaturated, radiation-curable groups and are based on polyester, polyurethane, polyepoxy(meth)acrylate, polyether, polyamide, polysiloxane, polycarbonate, polyepoxyacrylate, polyester acrylate, polyurethane polyacrylate and/or polyacrylate. In this context, the unsaturated, radiation-curable groups can be present bonded to one of the polymers mentioned and/or present in the form of radiation-curable monomers, so-called reactive diluents, in dispersion alongside the polymers mentioned.

The compounds of component C) include compounds dissolved or dispersed in water, such as, in particular, dispersions, which contain no unsaturated, radiation-curable groups, such as e.g. dispersions based on polyester, polyurethane, polyether, polyamide, polysiloxane, polycarbonate, polyurethane polyacrylate and/or polyacrylate.

In particular, if components B) and C) are compounds dissolved or dispersed in water, such as, in particular, dispersions, the addition of the water-dilutable, urethane (meth)acrylates A) according to the invention is advantageous, since the solids content of components B) and C) can be increased in this manner without a substantial increase in the resulting viscosity.

Initiators which can be activated by radiation and/or thermally can be employed as initiators of component D) for a free radical polymerization. Photoinitiators which are activated by UV or visible light are preferred here. A distinction is made in principle between two types of photoinitiators, the unimolecular (type I) and the bimolecular (type II). Suitable (type I) systems are aromatic ketone compounds, e.g. benzophenones in combination with tertiary amines, alkylbenzophenones, 4,4'-bis(dimethylamino) benzophenone (Michler's ketone), anthrone and halogenated benzophenones or mixtures of the types mentioned. (Type II) initiators, such as benzoin and its derivatives, benzil ketals, acylphosphine oxides, e.g. 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable.

The initiators, which are employed in amounts of between 0.1 and 10 wt. %, preferably 0.1 to 5 wt. %, based on the weight of the lacquer binder, can be used as the individual substance or, because of frequent advantageous synergistic effects, also in combination with one another.

If electron beams are used instead of UV radiation, no photoinitiator is required. Electron radiation, as is known to the person skilled in the art, is generated by means of thermal emission and accelerated via a potential difference. The high-energy electrons then break through a titanium film and are deflected to the binder to be cured. The general principles of electron beam curing are described in detail in "Chemistry & Technology of UV & EB Formulations for Coatings, Inks & Paints", vol. 1, P. K. T. Oldring (ed.), SITA Technology, London, England, p. 101-157, 1991.

In the case of thermal curing of the activated double bonds, this can also be carried out with addition of thermally dissociating agents which form free radicals. As is known to the person skilled in the art, suitable agents are e.g. peroxy compounds, such as dialkoxy dicarbonates, such as e.g. bis(4-tert-butylcyclohexyl) peroxydicarbonate, dialkyl peroxides, such as e.g. dilauryl peroxide, peresters of aromatic or aliphatic acids, such as e.g. tert-butyl perbenzoate or tert-amyl peroxy-2-ethylhexanoate, inorganic peroxides, such as e.g. ammonium peroxodisulfate, potassium peroxodisulfate, organic peroxides, such as e.g. 2,2-bis(tert-butylperoxy)butane, dicumyl peroxide, tert-butyl hydroperoxide, or also azo compounds, such as 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methylpropionamide), 2,2'-azobis{2-methyl-N-[2-(1-hydroxybutyl)]-propionamide}, 2,2'-azobis{2-methyl-N-[2-(1-hydroxybutyl)]propionamide, 2,2'-azobis{2-methyl-N-[1,1-bis(hydroxymethyl)-2-hydroxyethyl]propionamide. Highly substituted 1,2-diphenylethanes (benzopinacols), such as e.g. 3,4-dimethyl-3,4-diphenylhexane, 1,1,2,2-tetraphenylethane-1,2-diol or also silylated derivatives thereof, are also possible.

It is also possible to use a combination of photoinitiators and initiators which can be activated thermally.

Water and/or organic solvents which are known per se to the person skilled in the art can also optionally be co-used as component E). However, it is preferable to employ water as the sole diluent.

The composition can also contain UV absorbers and/or HALS stabilizers as auxiliary substances and additives (component F)) to increase the stability of the cured lacquer layer to weathering. A combination of UV absorbers and HALS stabilizers is preferred. The former advantageously have an absorption range of not more than 390 nm, for example UV absorbers such as triphenyltriazine types (e.g. Tinuvin® 400 (Ciba Spezialitätenchemie GmbH, Lampertheim, DE)), benzotriazoles (e.g. Tinuvin® 622 (Ciba Spezialitätenchemie GmbH, Lampertheim, DE)) or oxalic acid dianilides (e.g. Sanduvor® 3206 (Clariant, Muttenz, CH)), and are added in amounts of 0.5-3.5 wt. %, based on the solid resin. Suitable HALS stabilizers are obtainable commercially (Tinuvin® 292 or Tinuvin® 123 (Ciba Spezialitätenchemie GmbH, Lampertheim, DE) or Sanduvor® 3258 (Clariant, Muttenz, CH)). Preferred amounts are 0.5-2.5 wt %, based on the solid resin.

Likewise, F) can contain further auxiliary substances and additives known in lacquer technology, such as e.g. pigments, including metallic effect pigments, dyestuffs, matting agents, fillers, flow, wetting and deaeration additives, slip additives, nanoparticles, anti-yellowing additives, thickeners and additives for reduction of the surface tension as well as crosslinking agents.

Possible crosslinking agents are, preferably, non-blocked and/or blocked polyisocyanates, polyaziridines, polycarbodiimides and melamine resins. Non-blocked and/or blocked hydrophilized polyisocyanates are particularly preferred for aqueous coating compositions. Preferably ≤20 wt. %, particularly preferably ≤10 wt % of solid crosslinking agent, based on the solids content of the coating composition, is added.

The application of the coating compositions according to the invention to the material to be coated is carried out using the conventional and known methods in coating technology, such as spraying, knife-coating, rolling, pouring, dipping, whirler-coating, brushing or misting or by printing techniques, such as screen, gravure, flexographic or offset printing, and by transfer methods.

Suitable substrates are, for example, wood, metal, in particular also metal such as is used in the uses of so-called wire, coil, can or container lacquering, and furthermore plastic, also in the form of films, in particular ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PU, PVC, RF, SAN, PBT, PPE, POM, SMC, BMC, PP-EPDM and UP (abbreviations according to DIN 7728 Part 1), paper, leather, textiles, felt, glass, wood, wood materials, cork, inorganically bonded substrates, such as wood and fibre cement boards, electronic assemblies or mineral substrates. Substrates which comprise various of the abovementioned materials, or already coated substrates, such as vehicles, aircraft or ships and parts thereof, in particular vehicle bodies or attachments, can also be lacquered. It is also possible to apply the coating compositions only temporarily to a substrate and then to cure them partly or completely and optionally detach them again in order e.g. to produce films.

In particular, the coating compositions according to the invention are suitable for coating wood, wood-containing substrates, cork and substrates containing cellulose fibres, such as paper or cardboard.

For curing, e.g. water or, where appropriate, solvents present can be completely or partly removed by allowing to evaporate in air.

During the evaporation in air or thereafter, thermal and/or photochemical curing can be carried out.

If necessary, the thermal curing can be carried out at room temperature, but also at elevated temperature, preferably at 40-160° C., preferably at 60-130° C., particularly preferably at 80-110° C.

If photoinitiators are used in D), the radiation curing is preferably carried out by the action of actinic radiation, for example by irradiation with UV radiation or daylight, e.g. light of wavelength 200 to 700 nm, or by irradiation with high-energy electrons (electron radiation, 150 to 300 keV). High or medium pressure mercury vapour lamps, for example, serve as radiation sources for light or UV light, it being possible for the mercury vapour to be modified by doping with other elements, such as gallium or iron. Lasers, pulsed lamps (known by the name UV flash lamps), halogen lamps or excimer lamps are likewise possible. The lamps can be equipped, as a result of their design or by the use of special filters and/or reflectors, such that emission of a part of the UV spectrum is prevented. For example, for industrial hygiene reasons e.g. the radiation assigned to UV-C or UV-C and UV-B can be filtered out. The lamps can be installed in a fixed position, so that the goods to be irradiated are passed by the radiation source by means of a mechanical device, or the lamps can be movable and the goods to be irradiated do not change their position during curing. The radiation dose conventionally sufficient for crosslinking in UV curing is in the range of from 80 to 5,000 mJ/cm$^2$.

The irradiation can optionally also be carried out with exclusion of oxygen, e.g. under an inert gas atmosphere or oxygen-reduced atmosphere. Suitable inert gases are, preferably, nitrogen, carbon dioxide, noble gases or combustion gases. The irradiation can furthermore be carried out by covering the coating with media which are transparent for the radiation. Examples of these are e.g. films of plastic, glass, or liquids, such as water.

The type and concentration of the initiator optionally used are to be varied in a manner known to the person skilled in the art, depending on the radiation dose and curing conditions.

High pressure mercury lamps in installations of fixed position are particularly preferably employed for the curing. Photoinitiators are then employed in concentrations of from 0.1 to 10 wt. %, particularly preferably 0.2 to 3.0 wt. %, based on the solids content of the coating. For curing these coatings, a dose of from 200 to 3,000 mJ/cm$^2$, measured in the wavelength range of from 200 to 600 nm, is preferably used.

If thermally activatable initiators are used in D) curing occurs by increasing the temperature. In this context, the thermal energy can be introduced into the coating by radiation, thermal conduction and/or convection, the infra-red lamps, near infra-red lamps and/or ovens customary in coating technology conventionally being employed.

It is preferable to carry out the curing by actinic radiation.

The layer thicknesses applied (before curing) are typically between 0.5 and 5,000 μm, preferably between 5 and 1,000 μm, particularly preferably between 15 and 200 μm. If solvents are used, this is removed by the usual methods after the application and before the curing.

The invention also provides a process for the production of coatings on wood, ligneous substrates, cork and substrates containing cellulose fibres, characterized in that the coating composition according to the invention is applied to wood, ligneous substrates, cork and substrates containing cellulose fibres as described above and is then cured as described above.

The invention also provides substrates coated with the coating compositions according to the invention which contain the urethane (meth)acrylates prepared by the process according to the invention.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless stated otherwise, all the percentage data relate to percent by weight.

The NCO content was in each case monitored titrimetrically in accordance with DIN EN ISO 11909.

The viscosity measurements were carried out with a cone-plate rotary viscometer, MCR 51 from Anton Paar, DE, with a shear rate of 50 s$^{-1}$ in accordance with ISO/DIS 3219:1990.

The ambient temperature of 23° C. prevailing at the time the experiments were carried out is called RT.

The OH number was determined in accordance with DIN 53240-2.

The acid number was determined in accordance with DIN EN ISO 2114.

The amine number was determined in accordance with DIN 53176.

The solids content was determined gravimetrically, after all the volatile constituents had been evaporated off, in accordance with DIN EN ISO 3251.

The adhesion to oak was tested by means of a cross-hatch test in accordance with DIN EN ISO 2409.

The König pendulum hardness was tested on glass in accordance with DIN EN ISO 1522.

Testing against chemicals, such as 10% strength sodium hydroxide solution or 48% strength ethanol, was carried out in accordance with DIN 68861-1 and DIN EN 12720 on an oak wood sheet.

PUD Salt (N-(2-aminoethyl)-β-alanine sodium salt)

Analogously to the preparation instructions in EP-A 916 647, Example 1, 30 g of ethylenediamine and 36 g acrylic acid in 231 g of 17.3% strength sodium hydroxide solution were prepared. A clear, colourless solution of the PUD salt with a solids content of 40 wt. % was formed.

Partially Acrylated Alkoxylated Polyol 1

1,158 g of a trimethylolpropane-started ethylene oxide polyether with an OH number of 275 mg of KOH/g of substance (1.4 ethylene oxide units per OH group of the trimethylolpropane), 709 g of acrylic acid, 17 g of p-toluenesulfonic acid, 5 g of p-methoxyphenol and 0.4 g of 2,5-di-tert-butylhydroquinone in 724 g of isooctane were initially introduced into a 4,000 ml four-necked glass flask with a reflux condenser, heatable oil bath, mechanical stirrer, line for passing air through (2 l/h), internal thermometer, dropping funnel and water separator and were heated to 95° C. After approx. 20 hours under reflux, an acid number of 4 mg of KOH/g of substance was obtained. The isooctane was distilled off at a lower temperature under reduced pressure. 64 g of glycidyl methacrylate were then added at 90° C. and the mixture was stirred at 100° C. for a further hour. A colourless resin was obtained.

Partially Acrylated Alkoxylated Polyol 2

981 g of a trimethylolpropane-started ethylene oxide polyether with an OH number of 255 mg of KOH/g of substance (4.2 ethylene oxide units per OH group of the trimethylolpropane), 213 g of acrylic acid, 8.6 g of p-toluenesulfonic acid, 3.4 g of p-methoxyphenol and 0.23 g of 2,5-di-tert-butylhydroquinone in 489 g of isooctane were initially introduced into a 4,000 ml four-necked glass flask with a reflux condenser, heatable oil bath, mechanical stirrer, line for passing air through (2 l/h), internal thermometer, dropping funnel and water separator and were heated to 95° C. After approx. 20 hours under reflux, an acid number of 4 mg of KOH/g of substance was obtained. The isooctane was distilled off at a lower temperature under reduced pressure. 21 g of glycidyl methacrylate were then added at 90° C. and the mixture was stirred at 100° C. for a further hour. A colourless resin was obtained.

Partially Acrylated Alkoxylated Polyol 3

674 g of Polyol R 4290 (15-fold ethoxylated pentaerythritol, Perstorp Holding AB, Perstorp, SE), 935 g of Polyol R 4630 (5-fold ethoxylated pentaerythritol, Perstorp Holding AB, Perstorp, SE), 653 g of isooctane, 16.8 g of p-toluenesulfonic acid, 6.7 g of p-methoxyphenol, 0.45 g of 2,5-di-tert-butylhydroquinone and 751 g of acrylic acid were initially introduced into a 4,000 ml four-necked glass flask with a reflux condenser, heatable oil bath, mechanical stirrer, line for passing air through (2 l/h), internal thermometer and water separator and the temperature was increased slowly to the boiling point of the isooctane (95-105° C.), until a vigorous reflux became established. Approx. 125 g of water were then separated off and the reaction was interrupted when an acid number of 4 mg of KOH/g of substance was reached. The water separator was replaced by a distillation bridge and the isooctane was distilled off first under normal pressure and later under 50 mbar. 76 g of Epilox® A-1900 (bisphenol A diglycidyl ether, Leuna-Harze GmbH, Leuna, DE) were then admixed and the mixture was stirred at 100° C. for approx. one hour.

TABLE 1

Properties of the partially acrylated polyoxyalkylene polyols 1-3

| Partially acrylated polyol | OH number [mg of KOH/g] | OH functionality of the starter molecule | OH functionality of the partially acrylated polyol per molecule | Alkylene oxide content [wt. %] |
|---|---|---|---|---|
| 1 | 50 | 3.00 | 0.46 | 37 |
| 2 | 73 | 3.00 | 1.11 | 66 |
| 3 | 117 | 4.00 | 1.21 | 48 |

Example 1

Water-Dilutable Binder According to the Invention 447 g of the partially acrylated alkoxylated polyol 1, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 61 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of 1.3 wt. % had been reached, and the addition of 29 g of the solution of the PUD salt was carried out. After 30 minutes the NCO value had fallen to <0.1 wt. %. A clear, slightly yellowish resin was obtained.

Example 2

Water-Dilutable Binder According to the Invention 447 g of the partially acrylated alkoxylated polyol 1, 10.0 g of dimethylolpropionic acid, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 61 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of <0.1 wt. % was reached. A clear, slightly yellowish resin was obtained.

Example 3

Water-Dilutable Binder According to the Invention 531 g of the partially acrylated alkoxylated polyol 1, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 61 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of 0.6 wt. % had been reached, and the addition of 16.6 g of 3-(cyclohexylamino)propane-1-sulfonic acid and 7.6 g of triethylamine for neutralization of the sulfonic acid was carried out. After 120 minutes the NCO value had fallen to <0.1 wt. %. A clear, slightly yellowish resin was obtained.

Example 4

Water-Dilutable Binder According to the Invention 416 g of the partially acrylated alkoxylated polyol 1, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 61 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of 1.5 wt. % had been reached, and the addition of 32 g of the solution of the PUD salt was carried out. After 30 minutes the NCO value had fallen to <0.1 wt. %. A clear, slightly yellowish resin was obtained.

Example 5

Water-Dilutable Binder According to the Invention 402 g of the partially acrylated alkoxylated polyol 1, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 61 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of 1.6 wt. % had been reached, and the addition of 36 g of the solution of the PUD salt was carried out. After 30 minutes the NCO value had fallen to <0.1 wt. %. A clear, slightly yellowish resin was obtained.

Example 6

Water-Dilutable Binder According to the Invention 302 g of the partially acrylated alkoxylated polyol 1, 94 g of the partially acrylated alkoxylated polyol 2, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 61 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of 1.3 wt. % had been reached, and the addition of 29 g of the solution of the PUD salt was carried out. After 30 minutes the NCO value had fallen to <0.1 wt. %. A clear, slightly yellowish resin was obtained.

Example 7

Comparison: Analogous to Example 3 from DE-A 102010001956

363 g of polyethylene glycol 1000, 0.56 g of dimethylolpropionic acid, 3.8 g of neopentyl glycol, 67.4 g of hydroxyethyl acrylate, 192 g of dipropylene glycol diacrylate, 0.6 g of 2,6-di-tert-butyl-4-methylphenol, 0.06 g of phenothiazine, 0.56 g of tempol, 0.03 g of 2,5-di-tert-butylhydroquinone and 0.4 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 60° C. 139 g of toluene-diisocyanate (2,4- and 2,6-toluene-diisocyanate (TDI) in the ratio of 80:20) were then added dropwise such that the temperature of 70° C. was not exceeded. The mixture was subsequently stirred until an NCO value of 0.3 wt. % was reached. 21.5 g of dibutylamine were then added and the mixture was stirred at 65° C. for a further two hours. Finally, a further 118 g of dipropylene glycol diacrylate were dissolved. A colourless resin was obtained.

Example 8

Comparison: Analogous to Example 1 from WO-A 2009/095432

210.6 g of Carbowax® PEG 3000 (Dow, Midland, Mich., US), 187.2 g of Carbowax® PEG 4000 (Dow, Midland, Mich., US) together with 1-isocyanato-3,3,5-trimethyl-5-isocyanatomethylcycloexane and 316 g of acetone were initially introduced into a 2,000 ml four-necked glass flask with a reflux condenser, heatable oil bath, mechanical stirrer, line for passing air through (2 l/h), internal thermometer and dropping funnel and were heated to 50° C. 0.8 g of dibutyltin dilaurate was then added and the mixture was stirred at 60° C. for about two hours. First 0.8 g of 2,6-di-tert-butyl-4-methylphenol and then 336 g of pentaerythritol triacrylate were subsequently added and the mixture was stirred at 70° C. until an NCO value of less than 0.2 wt. % had been reached. After distilling off the acetone under reduced pressure, a resin which is solid at 23° C. was obtained.

Example 9

Comparison: Analogous to Example 2 from WO-A 2009/095432

808 g of the partially acrylated alkoxylated polyol 3 were initially introduced into a 1,000 ml four-necked glass flask with a reflux condenser, heatable oil bath, mechanical stirrer, line for passing air through (1 l/h), internal thermometer and dropping funnel together with 0.44 g of 2,6-di-tert-butyl-4-methylphenol and 0.74 g of dibutyltin dilaurate and were heated to 60° C. 40.8 g of 1-isocyanato-3,3,5-trimethyl-5-isocyanatomethylcyclohexane were then slowly added dropwise and the mixture was subsequently stirred at 60° C. until the NCO content had fallen below 0.2 wt. %. A colourless resin was obtained.

Example 10

Comparison 2,235 g of the partially acrylated alkoxylated polyol 1, 1.5 g of 2,6-di-tert-butylcresol and 0.1 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 222 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of <0.1 wt. % had been reached. A clear, slightly yellowish resin was obtained.

Example 11

Comparison 1,414 g of the partially acrylated alkoxylated polyol 2, 1.5 g of 2,6-di-tert-butylcresol and 0.1 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 222 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of <0.1 wt. % had been reached. A clear, slightly yellowish resin was obtained.

Example 12

Comparison 447 g of the partially acrylated alkoxylated polyol 1, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. A mixture of 46 g of 1-isocyanato-3,3,5-trimethyl-5-isocyanatomethylcyclohexane and 27 g of the isocyanurate trimer of hexamethylene-diisocyanate were then added dropwise such that a temperature of 65° C. was not exceeded. The mixture was subsequently stirred at 60° C. until an NCO value of 1.2 wt. % had been reached, and the addition of 29 g of the solution of the PUD salt was carried out. After 30 minutes the NCO value had fallen to <0.1 wt. %. A clear, slightly yellowish resin was obtained.

Example 13

Comparison 447 g of the partially acrylated alkoxylated polyol 1, 37.5 g of polyethylene glycol 1500, 0.5 g of 2,6-di-tert-butylcresol and 0.3 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 50° C. 46 g of 1-isocyanato-3,3,5-trimethyl-5-isocyanatomethylcyclohexane were then added dropwise such that a temperature of 65° C. was not exceeded. The mixture was subsequently stirred at 60° C. until an NCO value of 1.2 wt. % had been reached, and the addition of 10 g of the solution of the PUD salt was carried out. After 30 minutes the NCO value had fallen to <0.1 wt. %. A clear, slightly yellowish resin was obtained.

Testing against chemicals, such as 10% strength sodium hydroxide solution or 48% strength ethanol, was carried out in accordance with DIN 68861-1 and DIN EN 12720 on an oak wood sheet. (Rating 5: lacquer remains unchanged, rating 1: marked change in the surface, e.g. detachment of the lacquer)

TABLE 2

Properties of the water-dilutable polyurethane (meth)acrylates

| Example | 1 | 2 | 3 | 4 | 5 | 6 |
|---|---|---|---|---|---|---|
| Viscosity at 100% [mPa*s] | 1,950[1] | 2,500 | 1,500 | 4,800[1] | 3,250[1] | 5,260[1] |
| Alkylene oxide content [wt. %] | 31 | 31 | 32 | 30 | 30 | 36 |
| Polyisocyanate content [wt. %] | 11.3 | 11.5 | 9.9 | 12.0 | 12.2 | 12.5 |
| Acid number [mg of KOH/g] | 8.1 | 8.0 | 6.8 | 9.6 | 11.1 | 9.0 |

[1] at a solids content of 97 wt. % and a water content of 3 wt. % (the water content is due to the preparation)

TABLE 3

Properties of the water-dilutable polyurethane (meth)acrylates (comparison)

| Example | 7 (comp.) | 8 (comp.) | 9 (comp.) | 10 (comp.) | 11 (comp.) | 12 (comp.) | 13 (comp.) |
|---|---|---|---|---|---|---|---|
| Viscosity at 100 % [mPa*s] | 8,000 | solid | 830 | 2,300 | 6,800 | 11,100[1] | 1,850[1] |
| Alkylene oxide content [wt. %] | 56 | 50 | 44 | 34 | 57 | 30 | 36 |
| Polyisocyanate content [wt. %] | 15.4 | 7.4 | 4.8 | 9.0 | 13.5 | 13.2 | 11.0 |
| Acid number [mg of KOH/g] | 0 | 0 | 0 | 0 | 0 | 7.9 | 2.5 | comp. = comparison
[1] at a solids content of 97 wt. % and a water content of 3 wt. % (the water content is due to the preparation)

Lacquer Formulation and Use Testing

The water-dilutable polyurethane (meth)acrylates prepared were mixed with 3 wt. % of Irgacure®500 (mixture of benzophenone and 1-hydroxycyclohexyl phenyl ketone from BASF SE, Ludwigshafen, DE) and the corresponding amount of water (see Table 4 and 5) under shearing forces in a dispersing apparatus at 2,000 revolutions for 10 minutes. The mixture was drawn as a thin film on to a glass plate or oak wood sheet by means of a box doctor blade with a gap of 90 µm. After UV irradiation (medium pressure mercury lamp, IST Metz GmbH, Nürtingen, DE, 411 mJ/cm²), transparent, solid coatings were obtained.

The film hardness was tested by the person skilled in the art on glass by pressing the fingernail into the lacquer and is subjective. (Rating 5: The lacquer remains unchanged; Rating 1: The lacquer can be pressed in very significantly and is damaged)

The stability of the lacquer was tested at 23° C. (RT) with respect to after how many days a phase separation or a sedimentation takes place.

The adhesion to oak was tested by means of a cross-hatch test in accordance with DIN EN ISO 2409. (Rating 0: the cut edges are completely smooth; none of the squares of the grid has split off.)

The König pendulum hardness was tested on glass in accordance with DIN EN ISO 1522.

TABLE 4

Test results on wood and glass

| Example | 1 | 2 | 3 | 4 | 5 | 6 |
|---|---|---|---|---|---|---|
| Shear viscosity at 100% [mPa*s] | 1,950[1] | 2,500 | 1,500 | 4,800[1] | 5,250[1] | 5,260[1] |
| Konig pendulum hardness [sec] | 137 | 132 | 132 | 106 | 99 | 89 |
| Resistance to EtOH, 48%, 16 h, RT | 5 | 5 | 1 | 5 | 1 | 5 |
| Resistance to NaOH, 10%, 16 h, RT | 5 | 5 | 5 | 5 | 5 | 5 |
| Adhesion (oak) | 4 | 4 | 4 | 4 | 4 | 4 |
| Film hardness | 5 | 5 | 5 | 5 | 5 | 5 |
| Shear viscosity at 90% [mPa*s] | 1,280 | 1,400 | 610 | 3,200 | 2,410 | 2,100 |

TABLE 4-continued

Test results on wood and glass

| Example | 1 | 2 | 3 | 4 | 5 | 6 |
|---|---|---|---|---|---|---|
| Stability in days | >30 | >30 | >30 | >30 | >30 | >30 |
| Adhesion (oak) | 4 | 4 | 4 | 4 | 4 | 4 |
| Shear viscosity at 80% [mPa*s] | 450 | 1,910 | 600 | 2,950 | 4,220 | 1,970 |
| Stability in days | >30 | 5 | 7 | >30 | >30 | >30 |
| Adhesion (oak) | 0 | 0 | 0 | 0 | 0 | 0 |
| Shear viscosity at 70% [mPa*s] | 300 | 1,800 | 523 | 2,500 | 3,000 | 470 |
| Stability in days | >30 | 1 | 1 | >30 | >30 | >30 |
| Adhesion (oak) | 0 | 0 | 0 | 0 | 0 | 0 |
| Shear viscosity at 50% [mPa*s] | 120 | 50 | 40 | 270 | 270 | 40 |
| Stability in days | >30 | >30 | >30 | >30 | >30 | >30 |
| Adhesion (oak) | | | | | | |

[1] at a solids content of 97 wt. % and a water content of 3 wt. % (the water content is due to the preparation)
[2] Phase separation immediately or a few minutes after mixing of the lacquer

TABLE 5

Test results on wood and glass

| Example | 7 (comp.) | 8 (comp.) | 9 (comp.) | 10 (comp.) | 11 (comp. | 12 (comp.) | 13 (comp.) |
|---|---|---|---|---|---|---|---|
| Shear viscosity at 100% [mPa*s] | 8,000 | solid | 830 | 2,300 | 6,800 | 11,100[(1)] | 1,850[(1)] |
| König pendulum hardness [sec] | 26 | 70 | 40 | 73 | 114 | 120 | 73 |
| Resistance to EtOH, 48%, 16 h, RT | 1 | 1 | 3 | 3 | 1 | 5 | 1 |
| Resistance to NaOH, 10%, 16 h, RT | 1 | 1 | 3 | 3 | 2 | 5 | 1 |
| Adhesion (oak) | 4 | 4 | 4 | 4 | 4 | 4 | 4 |
| Film hardness | 1 | 4 | 4 | 4 | 1 | 5 | 3 |
| Shear viscosity at 90% [mPa*s] | 2,000 | 11,000 | 370 | 1,500 | 3,000 | 9130 | 1,600 |
| Stability in days | >30 | >30 | 10 | —[(2)] | >30 | >30 | >30 |
| Adhesion (oak) | 4 | 4 | 4 | 4 | 4 | 4 | 4 |
| Shear viscosity at 80% [mPa*s] | 1,800 | 5,000 | 330 | — | 700 | 11,300 | 950 |
| Stability in days | 2 | >30 | 1 | — | >30 | 5 | 2 |
| Adhesion (oak) | 0 | 0 | 0 | — | 0 | 0 | 0 |
| Shear viscosity at 70% [mPa*s] | 1,200 | 4,000 | 250 | — | 500 | 23,000 | 650 |
| Stability in days | 2 | >30 | 1 | — | >30 | 1 | 3 |
| Adhesion (oak) | 0 | 0 | 0 | — | 0 | 0 | 0 |
| Shear viscosity at 50% [mPa*s] | 180 | 7000 | — | — | —[(2)] | —[(2)] | —[(2)] |
| Stability in days | 1 | >30 | —[(2)] | — | — | — | — |
| Adhesion (oak) | 0 | 0 | 0 | — | — | — | — |

(comp.): comparison
[(1)]at a solids content of 97 wt. % and a water content of 3 wt. % (the water content is due to the preparation)
[(2)]Phase separation immediately or a few minutes after mixing of the lacquer The examples according to the invention (Table 4) all show low and easily processable shear viscosities of 1,500-5,260 mPas at a solids content of 100 wt. % or 97 wt. %. They are also all water-dilutable in the context of the invention. At water contents of ≥20 wt. %, very good adhesion results are achieved for examples according to the invention. The König pendulum hardnesses after radiation curing are in all cases above 89 seconds and were evaluated by the person skilled in the art as a high film hardness (rating=5). The water-dilutable binders according to the invention have adequate stabilities. The resistances to chemicals are very good.

Example 10 (comparison) is built up analogously to Example 1, but has no ionic groups (component (d)) (Table 5). At a solids content of 90 wt. %, the lacquer already falls apart directly after stirring into water.

The replacement of the partially acrylated polyol 1 with a low degree of alkoxylation by the more highly alkoxylated, partially acrylated alkoxylated polyol 2 in Example 11 (comparison) indeed leads to a very good water-dilutability, but the resulting high alkylene oxide content in the binder leads to a poor film hardness and to poor resistances to chemicals.

The partial incorporation of a trifunctional isocyanate in Example 12 (comparison) leads to a high starting viscosity. Furthermore, the binder is not water-dilutable in the context of the invention.

Examples 7, 8 and 9 (comparison) are indeed water-dilutable, but the stability of Examples 7 and 9 at solids contents of ≤80 wt. % is inadequate. Example 8 (comparison) is solid at a solids content of 100 wt. %, which is to be attributed to the high content of polyethylene glycol. Example 8 must therefore be melted before the dilution with water, which represents a disadvantage in its handling.

The König pendulum hardness is low for Examples 7 to 9 and results in less good film hardnesses and mostly very poor resistances to chemicals.

The invention claimed is:

1. A process for preparing a low-viscosity, water-dilutable polyurethane (meth)acrylate, comprising reacting components (a), (b), and (d)
   (a) at least one organic polyisocyanate with two isocyanate functions;
   (b) at least one polyoxyalkylene polyol based on a starter molecule which comprises at least three hydroxy functions and is partially reacted by esterification with (meth)acrylic acid such that on average 0.2 to 1.5 hydroxy functions still remain;
   (d) at least one compound which has at least one group which is reactive towards isocyanate and at least one ionic or potentially ionic function, wherein the at least one group reactive towards isocyanate is an amino group, and wherein component (d) is an addition product of acrylic acid and a diamine, wherein the molar ratio of acrylic acid to diamine is 1:1;
to form said low-viscosity, water-dilutable polyurethane (meth)acrylate, wherein, said polyurethane (meth)acrylate contains less than 40 weight % of alkylene oxide units; wherein
the reaction product of components (a), (b), and (d) has an NCO content of less than 0.5 weight %, and
said polyurethane (meth)acrylate is not prepared from either of
   (i) organic polyisocyanates with three or more isocyanate functions, or
   (ii) polyoxyalkylene polyols which have a maximum of two hydroxy functions but no further groups which can be crosslinked by actinic radiation.

2. The process of claim 1, wherein the reacting step further comprises reacting at least one hydroxyalkyl (meth)acrylate with components (a), (b), and (d).

3. The process of claim 1, wherein a further component (e), which is an organic compound which has one or two isocyanate-reactive functions and a molecular weight of less than 240 g/mol, is reacted with components (a), (b), and (d).

4. The process of claim 1, wherein component (d) is at least one compound with at least one group which is reactive towards isocyanate and at least one potentially anionic group.

5. The process of claim 1, wherein a further component (e), which is an organic compound which has one or two isocyanate-reactive functions and a molecular weight of less than 240 g/mol, is reacted with components (a), (b), and (d) and is employed in amounts of from 0 to 20 weight %, wherein the reacting step further comprises reacting 0 to 20 weight % of at least one hydroxyalkyl (meth)acrylate with components (a), (b), and (d), wherein component (a) is employed in amounts of from 8 to 40 weight %, component (b) is employed in amounts of from 40 to 90 weight %, component (d) is employed in amounts of from 1 to 6 weight % and wherein the sum of the weight % of the at least one hydroxyalkyl (meth)acrylate and components (a), (b), (d) and (e) does not exceed 100.

6. The process of claim 1, wherein component (d) is an addition product of acrylic acid on ethylenediamine.

7. The process of claim 1, wherein component (d) is a PUD salt.

8. The process of claim 1, wherein component (d) is N-(2-aminoethyl)-beta-alanine.

9. The process of claim 1, wherein the diamine is isophoronediamine.

10. The process of claim 1, wherein the diamine is ethylenediamine.

11. The process of claim 1, wherein the molar ratio of component (a) to component (b) is between 1:1 to 1:1.5.

12. A water-dilutable polyurethane (meth)acrylate obtained by the process of claim 1.

13. A coating comprising the water-dilutable polyurethane (meth)acrylate of claim 12.

14. The coating of claim 13, wherein said coating is a lacquer or adhesive.

15. A coating composition comprising
A) at least one polyurethane (meth)acrylate of claim 12;
B) compounds which differ from A) and contain groups which react, by polymerization, with ethylenically unsaturated compounds under the action of actinic radiation;
C) aqueous binders which are not radiation-curable;
D) initiators;
E) optionally water and/or solvents; and
F) optionally auxiliary substances and additives.

16. A coating composition comprising
A) at least one polyurethane (meth)acrylate of claim 12;
B) compounds, dissolved or dispersed in water, which contain unsaturated radiation-curable groups;
C) compounds, dissolved or dispersed in water, which contain no unsaturated radiation-curable groups;
D) initiators;
E) optionally water and/or solvents; and
F) optionally auxiliary substances and additives.

17. A substrate coated with the composition of claim 15.

18. The substrate of claim 17, wherein said substrate is wood, ligneous substrates, cork, and substrates containing cellulose fibres.

19. A process for preparing a low-viscosity, water-dilutable polyurethane (meth)acrylate, comprising reacting components (a), (b), and (d)
(a) at least one organic polyisocyanate with two isocyanate functions;
(b) at least one polyoxyalkylene polyol based on a starter molecule which comprises at least three hydroxy functions and is partially reacted by esterification with (meth)acrylic acid such that on average 0.2 to 1.5 hydroxy functions still remain;
(d) at least one compound which has at least one group which is reactive towards isocyanate and at least one ionic or potentially ionic function, wherein the at least one group reactive towards isocyanate is an amino group, and wherein component (d) is an addition product of acrylic acid and a diamine, wherein the molar ratio of acrylic acid to diamine is 1:1;
to form said low-viscosity, water-dilutable polyurethane (meth)acrylate, wherein said polyurethane (meth)acrylate contains less than 40 weight % of alkylene oxide units;
wherein
the reaction product of components (a), (b), and (d) has an NCO content of less than 0.5 weight %, and
said polyurethane (meth)acrylate is not prepared from either of
(i) organic polyisocyanates with three or more isocyanate functions, or
(ii) polyoxyalkylene polyols which have a maximum of two hydroxy functions but no further groups which can be crosslinked by actinic radiation;
wherein the low-viscosity, water-dilutable polyurethane (meth)acrylate has a shear viscosity at 23° C. in accordance with DIN EN ISO 3219 of ≤20 Pas; and
wherein, after addition of water the viscosity of the water-dilutable polyurethane (meth) acrylate at a solids content of from 70 to 95 wt. % is the same as or lower or lower than above a solids content of 95 wt. %; and
wherein, after addition of water, the water-dilutable polyurethane (meth)acrylate forms a homogeneous phase above a solids content of 70 wt. %.

* * * * *